United States Patent
Kuo et al.

(10) Patent No.: US 8,588,357 B2
(45) Date of Patent: Nov. 19, 2013

(54) PHASE SELECTOR CAPABLE OF TOLERATING JITTER AND METHOD THEREOF, AND CLOCK AND DATA RECOVERY CIRCUIT

(75) Inventors: Kuo-Cyuan Kuo, Tainan (TW); Huei-Chiang Shiu, New Taipei (TW); Hsieh-Huan Yen, Taipei (TW)

(73) Assignee: Etron Technology, Inc., Hsinchu (TW)

( * ) Notice: Subject to any disclaimer, the term of this patent is extended or adjusted under 35 U.S.C. 154(b) by 204 days.

(21) Appl. No.: 13/282,470

(22) Filed: Oct. 27, 2011

(65) Prior Publication Data

US 2012/0121052 A1    May 17, 2012

(30) Foreign Application Priority Data

Nov. 16, 2010   (TW) .............................. 99139344 A

(51) Int. Cl.
  *H04L 7/00*    (2006.01)
  *H04L 25/00*   (2006.01)
  *H04L 25/40*   (2006.01)

(52) U.S. Cl.
  USPC .......................................... 375/371; 375/226

(58) Field of Classification Search
  USPC .................. 375/226, 340, 342, 371, 377, 355
  See application file for complete search history.

(56) References Cited

U.S. PATENT DOCUMENTS

| 6,901,126 | B1* | 5/2005 | Gu | 375/355 |
| 2004/0169539 | A1* | 9/2004 | Gauthier et al. | 327/231 |
| 2007/0064850 | A1* | 3/2007 | Tamura | 375/355 |
| 2008/0012615 | A1* | 1/2008 | Park | 327/158 |
| 2009/0256595 | A1* | 10/2009 | Wu | 327/2 |

* cited by examiner

*Primary Examiner* — Jean B Corrielus
(74) *Attorney, Agent, or Firm* — Winston Hsu; Scott Margo

(57) ABSTRACT

A phase selector capable of tolerating jitters is applied in a clock and data recovery circuit. The phase selector includes a comparing module, a weighting circuit, and a predictor. The comparing module compares a phase-detecting signal and a phase-selecting signal corresponding to the last cycle so as to generate an error signal. The weighting circuit calculates a weighting error signal according to the error signal and a weighting parameter. The phase predictor compares the weighting error signal and predetermined threshold values so as to generate the phase-selecting signal corresponding to the present cycle. When the received input data stream of the clock and data recovery circuit has a small jitter, the phase selector rapidly locks the phase so as to generate the correct phase-selecting signal. When the received input data stream of the clock and data recovery circuit has a large jitter, the phase selector stably generates the phase-selecting signal.

14 Claims, 10 Drawing Sheets

|  | $T_1$ | $T_2$ | $T_3$ | $T_4$ | $T_5$ | $T_6$ |
|---|---|---|---|---|---|---|
| $S_{PD}$ | $R_1$ | $R_1$ | $R_2$ | $R_2$ | $R_2$ | $R_0$ |
| $S_{ER1}$ |  | 0 | −1 | −1 | 0 | 2 |
| $S_{ER2}$ |  | 0 | 0 | −1 | 0 | 0 |
| $S_{WER}$ ($W_1=2, W_2=1$) |  | 0 | −2 | −3 | 0 | 4 |
| $S_{PA}$ |  | no change | no change | Shifting right | no change | Shifting left |
| $S_{PH}$ | $R_1$ | $R_1$ | $R_1$ | $R_2$ | $R_2$ | $R_1$ |

FIG. 5

| | T1 | T2 | T3 | T4 | T5 | T6 |
|---|---|---|---|---|---|---|
| $S_{PD}$ | $R_1$ | $R_1$ | $R_1$ | $R_1$ | $R_2$ | $R_2$ |
| $S_{ER1}$ | | 0 | 0 | 0 | -1 | -1 |
| $S_{ER2}$ | | 0 | 0 | 0 | 0 | -1 |
| $S_{WER}$ ($W_1=2, W_2=1$) | | 0 | 0 | 0 | -2 | -3 |
| $S_{PA}$ | | no change | no change | no change | no change | Shifting right |
| $S_{PH}$ | $R_1$ | $R_1$ | $R_1$ | $R_1$ | $R_1$ | $R_2$ |

FIG. 6

| | T1 | T2 | T3 | T4 | T5 | T6 | T7 | T8 |
|---|---|---|---|---|---|---|---|---|
| $S_{PD}$ | $R_1$ | $R_1$ | $R_2$ | $R_2$ | $R_1$ | $R_2$ | $R_1$ | $R_2$ |
| $S_{ER1}$ | | 0 | −1 | −1 | 1 | 0 | 1 | 0 |
| $S_{ER2}$ | | 0 | 0 | −1 | 0 | 1 | 0 | 1 |
| $S_{WER}$ ($W_1=2, W_2=1$) | | 0 | −2 | −3 | 2 | 1 | 2 | 1 |
| $S_{PA}$ | | no change | no change | Shifting right | no change | no change | no change | no change |
| $S_{PH}$ | $R_1$ | $R_1$ | $R_1$ | $R_2$ | $R_2$ | $R_2$ | $R_2$ | $R_2$ |

FIG. 7

| | T1 | T2 | T3 | T4 | T5 | T6 |
|---|---|---|---|---|---|---|
| $S_{PD}$ | $R_1$ | $R_1$ | $R_2$ | $R_2$ | $R_2$ | $R_0$ |
| $S_{ER1}$ | | | -1 | -1 | 0 | 2 |
| $S_{ER2}$ | | | 0 | -1 | 0 | 0 |
| $S_{ER3}$ | | | 0 | 0 | 0 | 0 |
| $S_{WER}$ ($W_1=2, W_2=1, W_3=1$) | | | -2 | -3 | 0 | 4 |
| $S_{PA}$ | | | no change | Shifting right | no change | Shifting left |
| $S_{PH}$ | $R_1$ | $R_1$ | $R_1$ | $R_2$ | $R_2$ | $R_1$ |

PHASE SELECTOR CAPABLE OF TOLERATING JITTER AND METHOD THEREOF, AND CLOCK AND DATA RECOVERY CIRCUIT

BACKGROUND OF THE INVENTION

1. Field of the Invention

The present invention is related to a phase selector, and more particularly, to a phase selector capable of tolerating jitter and suitable for a clock and data recovery circuit.

2. Description of the Prior Art

Generally, in a serial interface, a transmitter end combines data with a clock signal into an input data stream, and outputs the input data stream to a receiver end. This way, a clock and data recovery circuit is required at the receiver end, for restoring information of the clock signal from the input data stream, and sampling the input data stream according to a phase of the obtained clock signal, so as to attain the actual data transmitted by the input data stream.

Please refer to FIG. 1 and FIG. 2. FIG. 1 and FIG. 2 are diagrams illustrating a clock and data recovery circuit 100 of the prior art. As shown in FIG. 1, the clock and data recovery circuit 100 comprises an over-sampling circuit 110, a phase detecting module 120, a phase selector 130 and a back-end processing module 140. The over-sampling circuit 110 over-samples an input data stream $DS_{IN}$, for generating an over-sampling signal $S_{OS}$. The phase detecting module 120 comprises a transition detecting circuit 121 and a phase detecting circuit 122. The transition detecting circuit 121 detects a transition of the over-sampling signal $S_{OS}$, for generating a transition signal $S_{TR}$. The phase detecting circuit 122 generates a phase detecting signal $S_{PD}$ according to the transition signal $S_{TR}$. The phase selector 130 generates a phase selecting signal $S_{PH}$ according to the phase detecting signal $S_{PD}$. The back-end processing module 140 selects the appropriate over-sampling signal $S_{OS}$ to be an output data signal $S_{DOUT}$.

More specifically, assume the over-sampling circuit 110 over-samples the input data stream $DS_{IN}$ with quintupled frequency as shown in FIG. 2, so in each cycle (e.g. cycle $T_1$-$T_3$), the over-sampling circuit 110 over-samples the input data stream $DS_{IN}$ at over-sampling instances $P_0$-$P_4$, for obtaining the over-sampling signal $S_{OS}$. Intervals in between the over-sampling instances $P_0$-$P_4$ can be defined as regions $R_0$-$R_4$. Practically, the transition detecting circuit 121 can be realized with an XOR circuit. Therefore, when the over-sampling signal $S_{OS}$ transforms from logic "0" to logic "1" or from logic "1" to logic "0", the transition detecting circuit 121 generates the transition signal $S_{TR}$ of logic "1" accordingly. In other words, when the transition signal $S_{TR}$ is logic "1", the input data stream $DS_{IN}$ undergoes transition at a region corresponding to the transition signal $S_{TR}$. The phase detecting circuit 122 obtains the region corresponding to when the transition of the input data stream $DS_I$ occurs, by detecting the transition signal $S_{TR}$ of logic "1". This way, the phase detecting circuit 122 can output the phase detecting signal $S_{PD}$ to represent the transition region of the input data stream $DS_{IN}$. For instance, in the cycle $T_1$ of FIG. 2, the input data stream $DS_{IN}$ generates a rising edge in the region $R_1$, so the phase detecting circuit 122 outputs the phase detecting signal $S_{PD}$ representing the region "$R_1$"; in the cycle $T_2$, the input data stream $DS_{IN}$ generates a falling edge in the region $R_1$, so the phase detecting circuit 122 outputs the phase detecting signal $S_{PD}$ representing the region "$R_1$"; in the cycle $T_3$, the input data stream $DS_{IN}$ generates a rising edge in the region $R_0$, so the phase detecting circuit 122 outputs the phase detecting signal $S_{PD}$ representing the region "$R_0$". The phase selector 130 can obtain the transition region of the input data stream $DS_{IN}$ in each cycle according to the transition signal $S_{TR}$ (e.g. the transition region is $R_1$ in the cycle $T_1$). The phase selector 130 can accumulate accumulated transition numbers $N_{R0}$-$N_{R4}$ in each cycle according to the transition region in each cycle, and the phase selector 130 generates the phase selecting signal $S_{PH}$ according to the largest accumulated transition number.

For instance, the transition region in the cycle $T_1$ is $R_1$, so in the cycle $T_1$, the accumulated transition number $N_{R1}$ of the phase selector 130 is 1, and the other accumulated transition numbers are 0. The accumulated transition number $N_{R1}$ possesses the largest value for the time being, so the phase selector 130 generates the phase selecting signal $S_{PH}$ representing the region "$R_1$". The transition region in the cycle $T_2$ is also $R_1$, so in the cycle $T_2$, the accumulated transition number $N_{R1}$ of the phase selector 130 is accumulated to be 2, and the other accumulated transition numbers are 0. The accumulated transition number $N_{R1}$ still possesses the largest value for the time being, so the phase selector 130 still generates the phase selecting signal $S_{PH}$ representing the region "$R_1$". The transition region in the cycle $T_3$ is $R_0$, so in the cycle $T_3$, the accumulated transition number $N_{R1}$ of the phase selector 130 is still 2, the accumulated transition number $N_{R0}$ of the phase selector 130 becomes 1, and the other accumulated transition numbers remain 0. Although the transition region in the cycle $T_3$ is $R_0$, since the accumulated transition number $N_{R1}$ still possesses the largest value, the phase selector 130 still generates the phase selecting signal $S_{PH}$ representing the region "$R_1$".

The back-end processing module 140 can determine the region in which the transition of the clock signal occurs according to the phase selecting signal $S_{PH}$. Hence the back-end processing module 140 can select an appropriate over-sampling signal $S_{OS}$ to be the output data signal $S_{DOUT}$. For instance, in the cycle $T_1$, the back-end processing module 140 can determine the over-sampling instance $P_4$ to correspond to a steady state of the input data stream $DS_{IN}$ (i.e. since the over-sampling instance $P_4$ is approximately in the middle between the region $R_1$ in the cycle $T_1$ and the region $R_1$ in the cycle $T_2$), according to the transition region $R_1$. This way, the back-end processing module 140 selects the over-sampling signal $S_{OS}$ corresponding to the over-sampling instance $P_4$ to be the output data signal $S_{DOUT}$.

However, for the phase selector 130 of the prior art, assuming initial transitions of the clock signal of the transmitter end all occur in the region $R_1$, the accumulated transition number $N_{R1}$ corresponding to the region $R_1$ has accumulated to a degree that the accumulated transition number $N_{R1}$ far exceeds the accumulated transition numbers $N_{R0}$ and $N_{R2}$ which correspond to regions $R_0$ and $R_2$, respectively. At this moment, if the input data stream $DS_{IN}$ has a small jitter (e.g. the region corresponding to a transition edge of the clock signal of the transmitter end changes from region $R_1$ to $R_0$), since a value of the accumulated transition number $N_{R1}$ is still far greater than the accumulated transition numbers $N_{R0}$ and $N_{R2}$ (in other words, the memory effect of the phase selector 130 of the prior art), the clock and data recovery circuit 100 still outputs the phase selecting signal $S_{PH}$ representing the region "$R_1$". Therefore, the back-end processing module 140 is likely to select the incorrect over-sampling signal $S_{OS}$ to be the output data signal $S_{DOUT}$.

Furthermore, assuming values of the accumulated transition numbers $N_{R0}$ and $N_{R1}$ are approximately the same, if the input data stream $DS_{IN}$ has a large jitter (e.g. the region corresponding to a transition edge of the clock signal of the transmitter end switches continuously between regions $R_0$ and $R_1$), since the largest accumulated transition number switches continuously between accumulated transition numbers $N_{R0}$ and $N_{R1}$, the clock and data recovery circuit 100 continuously selects the over-sampling signal $S_{OS}$ corresponding to different over-sampling instances (such as over-sampling instances $P_3$ and $P_4$) to be the output data signal $S_{DOUT}$. Consequently, system instability results, causing inconvenience to the user.

SUMMARY OF THE INVENTION

The present invention discloses a phase selector capable of tolerating jitter for a clock and data recovery circuit. The clock and data recovery circuit comprises an over-sampling circuit, a phase detecting module and a back-end processing module. The over-sampling circuit over-samples an input data stream in each cycle, for generating M over-sampling signals. The phase detecting module detects the M over-sampling signals for determining a transition region of the input data stream in each cycle and generating a phase detecting signal accordingly. The phase selector generates a phase selecting signal according to the phase detecting signal. The back-end processing module selects one of the M over-sampling signals to be an output data signal according to the phase selecting signal. The phase selector comprises a comparing module, a weighting circuit and a predictor. The comparing module is for comparing the phase detecting signal generated by the phase detecting module with a phase selecting signal corresponding to a previous cycle, and comparing a phase detecting signal corresponding to previous N cycles with the phase selecting signal corresponding to the previous cycle, for generating (N+1) error signals. The weighting circuit is for calculating a weighting error signal according to the (N+1) error signals and (N+1) weighting parameters. The predictor is for comparing the weighting error signal, a first predetermined threshold value and a second predetermined threshold value, for generating a phase adjusting signal, and generating the phase selecting signal according to the phase adjusting signal and the phase selecting signal corresponding to the previous cycle. M and N represent positive integers respectively.

The present invention further discloses a phase selecting method for tolerating jitter for a clock and data recovery circuit. The clock and data recovery circuit comprises an over-sampling circuit, a phase detecting module, and a back-end processing module. The over-sampling circuit over-samples an input data stream in each cycle, for generating M over-sampling signals. The phase detecting module detects the M over-sampling signals for determining a transition region of the input data stream in each cycle and generating a phase detecting signal accordingly. The phase selecting method generates a phase selecting signal according to the phase detecting signal. The back-end processing module selects one of the M over-sampling signals to be an output data signal according to the phase selecting signal. The phase selecting method comprises comparing the phase detecting signal generated by the phase detecting module with a phase selecting signal corresponding to a previous cycle, and comparing a phase detecting signal of previous N cycles with the phase selecting signal corresponding to the previous cycle, for generating (N+1) error signals; calculating a weighting error signal according to the (N+1) error signals and (N+1) weighting parameters; comparing the weighting error signal, a first predetermined threshold value and a second predetermined threshold value, for generating a phase adjusting signal; and generating the phase selecting signal according to the phase adjusting signal and the phase selecting signal corresponding to the previous cycle. M and N represent positive integers respectively.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating internal signals of the phase selector of the present invention.

FIG. 6 is a diagram illustrating the phase selector of the present invention can rapidly lock the phase when the input data stream has small jitter.

FIG. 7 is a diagram illustrating the phase selector can stably generate the phase selecting signal when the input data stream has a large jitter.

FIG. 9 is a diagram illustrating internal signals of the phase selector shown in FIG. 8 according to an embodiment of the present invention.

DETAILED DESCRIPTION

Figure 1:
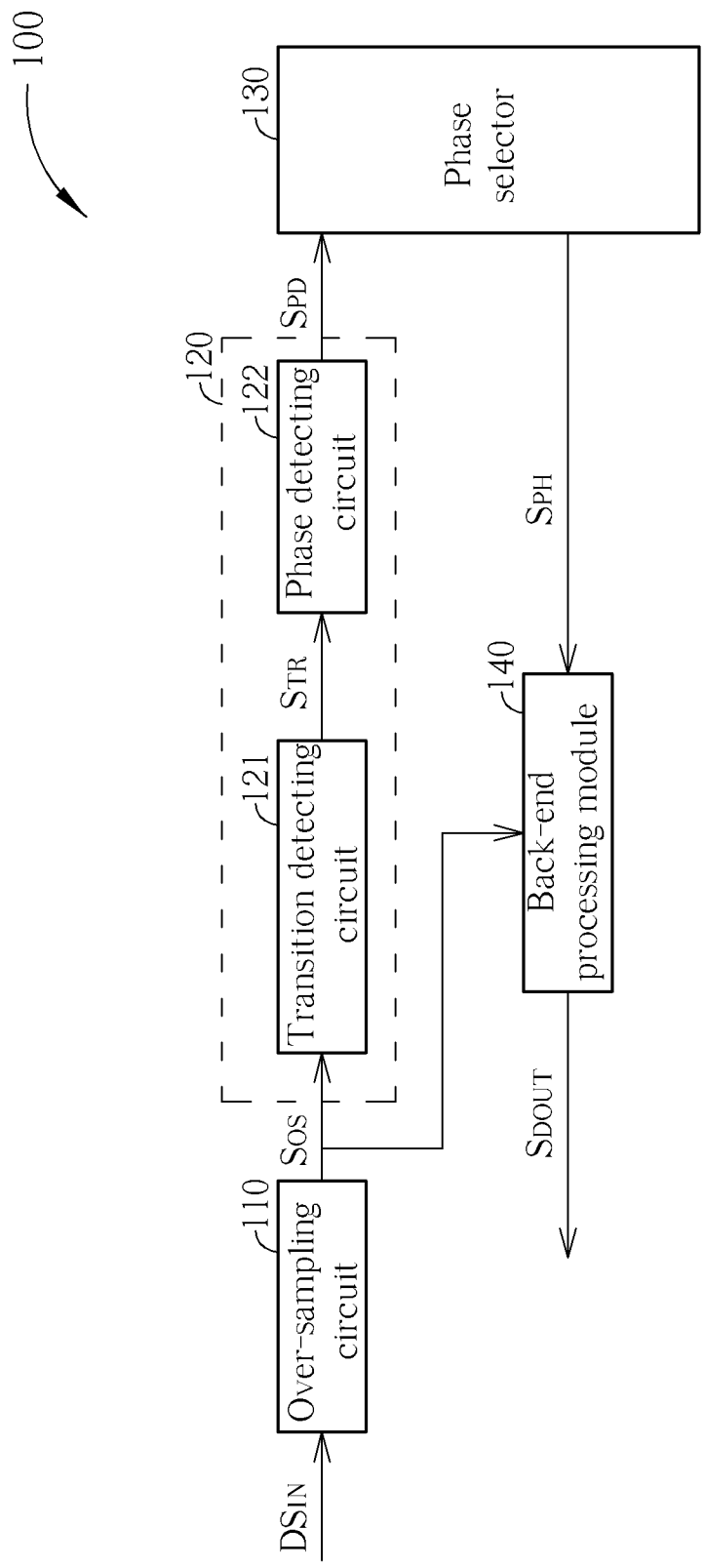
FIG. 1 and FIG. 2 are diagrams illustrating a clock and data recovery circuit of the prior art.
Figure 2:
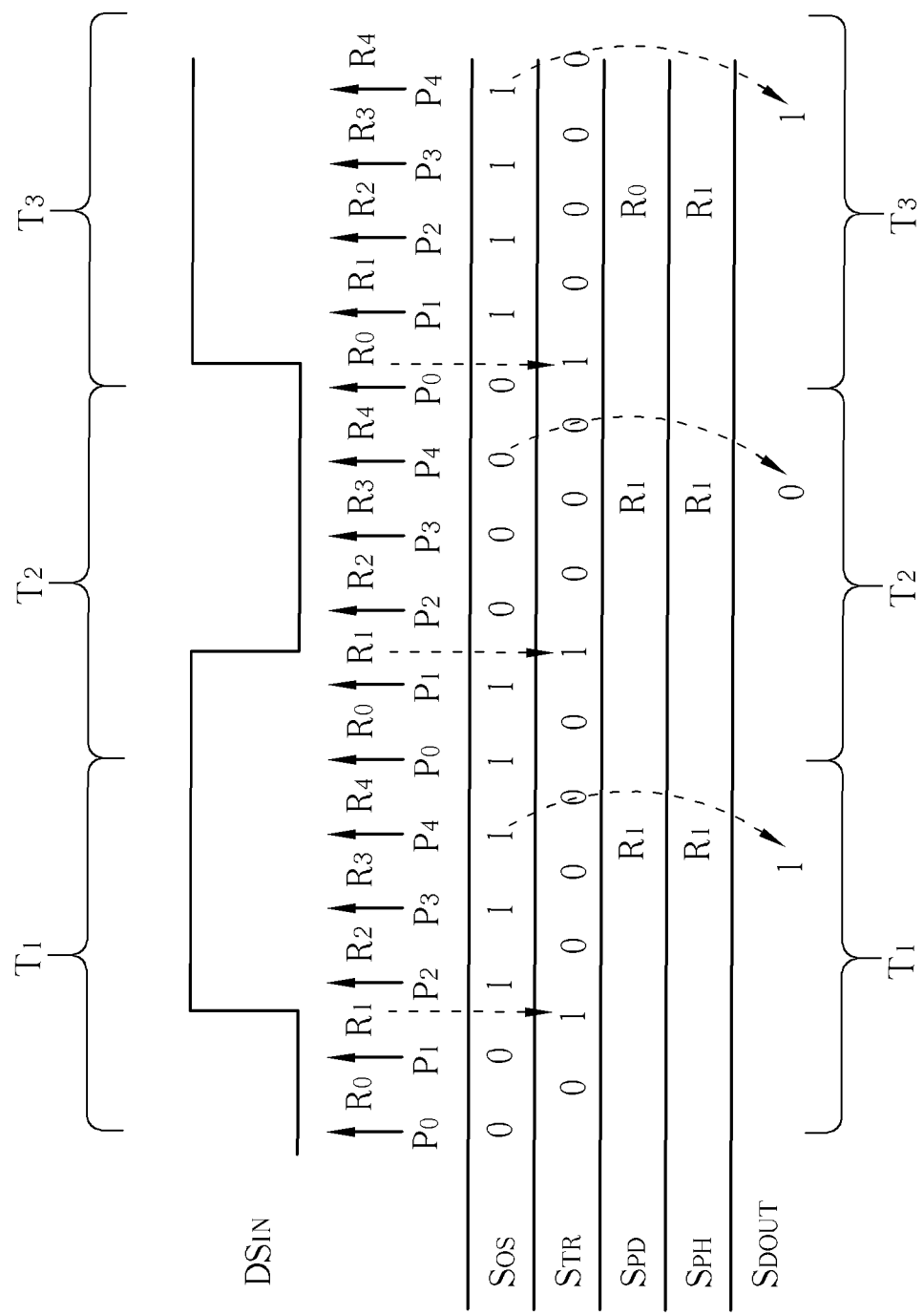
Figure 3:
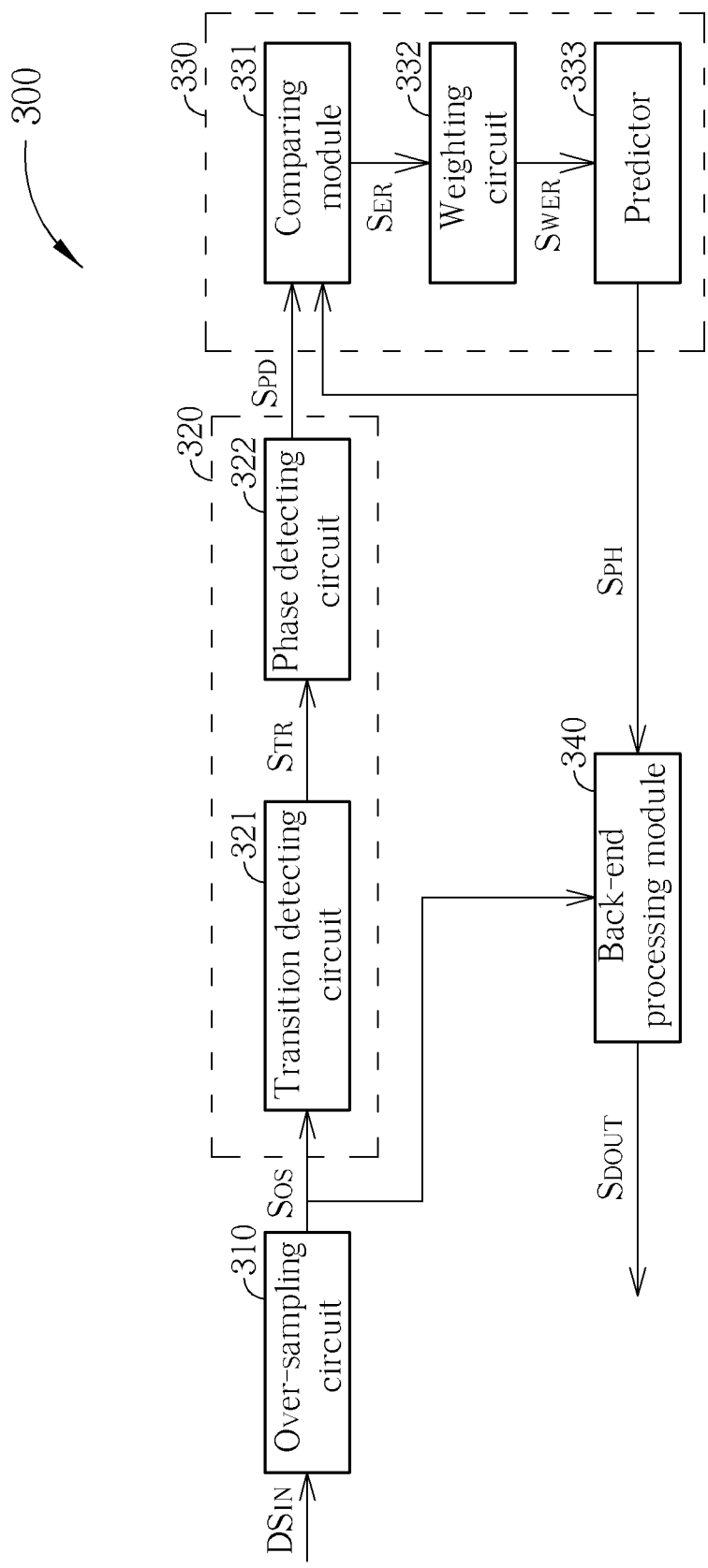
FIG. 3 is a diagram illustrating a phase selector capable of tolerating jitter of the present invention.

Please refer to FIG. 3. FIG. 3 is a diagram illustrating a phase selector 330 capable of tolerating jitter of the present invention. The phase selector 330 is for a clock and data recovery circuit 300, wherein structures and operating principles of the over-sampling circuit 310, the phase detecting module 320, the transition detecting circuit 321, the phase detecting circuit 322 and the back-end processing module 340 are similar to the over-sampling circuit 110, the phase detecting module 120, the transition detecting circuit 121, the phase detecting circuit 122 and the back-end processing module 140, respectively, so relative details are omitted hereinafter. The phase selector 330 comprises a comparing module 331, a weighting circuit 332 and a predictor 333. The comparing module 331 compares the phase detecting signal $S_{PD}$ with the phase selecting signal $S_{PH}$, for generating the error signal $S_{ER}$. The weighting circuit 332 generates a weighting error signal $S_{WER}$ according to the error signal $S_{ER}$ and a weighting parameter W. The predictor 333 adjusts the phase selecting signal $S_{PH}$ according to the weighting error signal $S_{WER}$.

Figure 4:
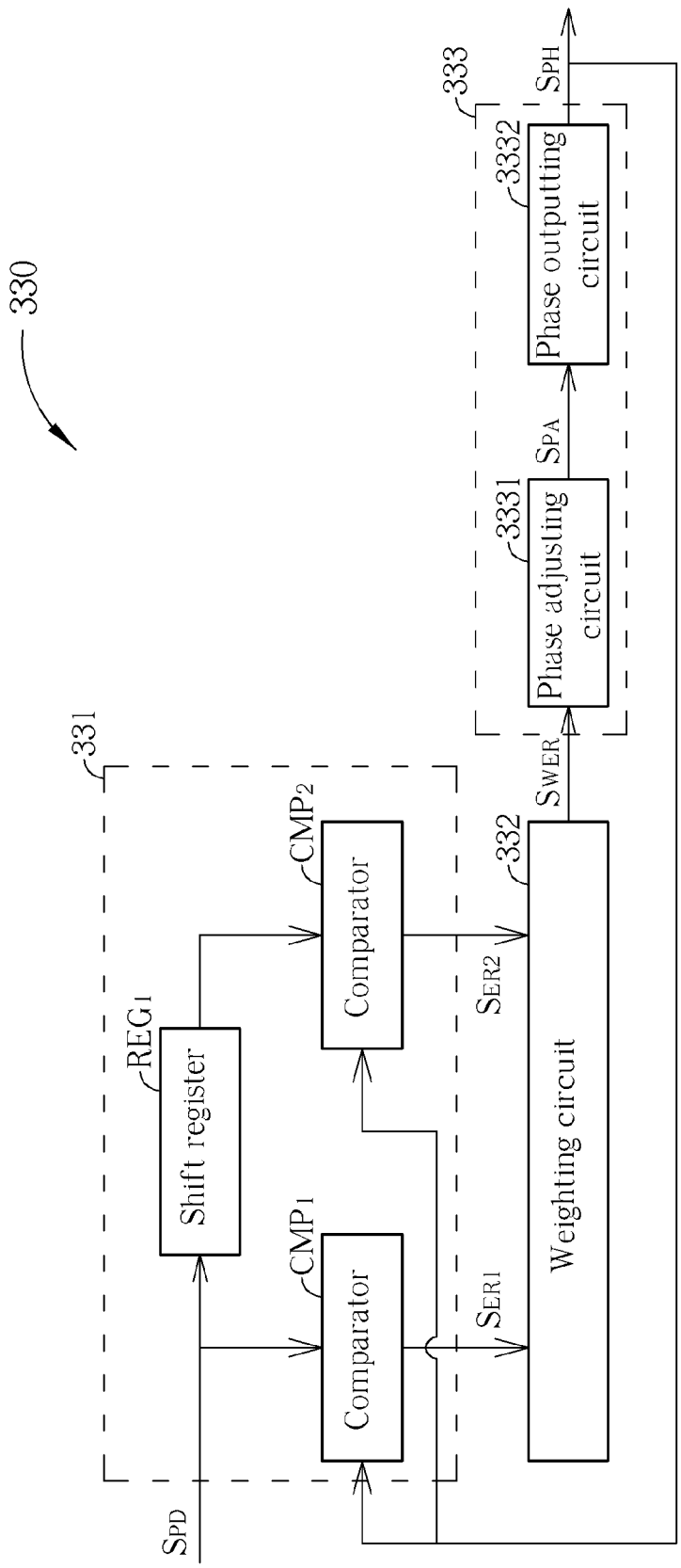
FIG. 4 is a diagram further explains the comparing module, the weighting circuit and the predictor of the present invention.

Please refer to FIG. 4. FIG. 4 is a diagram further explaining the comparing module 331, the weighting circuit 332 and the predictor 333 of the present invention. The comparing module 331 comprises a shift register $REG_1$ and comparators $CMP_1$-$CMP_2$. The shift register $REG_1$ is for temporarily storing and shifting the phase detecting signal $S_{PD}$. For instance, in the cycle $T_1$, when the shift register $REG_1$ receives the phase detecting signal $S_{PD1}$ representing the region "$R_0$", the shift register $REG_1$ temporarily stores the phase detecting signal $S_{PD1}$ representing the region "$R_0$". In the cycle $T_2$, the shift register $REG_1$ receives the phase detecting signal $S_{PD2}$ representing the region "$R_1$". At this moment, the shift register $REG_1$ outputs the temporarily stored phase detecting signal $S_{PD}$ (i.e. the phase detecting signal $S_{PD1}$ which represents the region "$R_0$") to the comparator $CMP_2$, and the shift register $REG_1$ temporarily stores the phase detecting signal $S_{PD2}$ representing the region "$R_1$". In other words, when the shift register $REG_1$ receives the phase detecting signal $S_{PDX}$ corresponding to the cycle $T_X$, the shift register $REG_1$ outputs the temporarily stored phase detecting signal $S_{PD}$ (i.e. the phase detecting signal $S_{PD(X-1)}$ corresponding to the cycle $T_{(X-1)}$) to the comparator $CMP_2$, and the shift register $REG_1$ temporarily stores the currently received phase detecting signal $S_{PD}$ (i.e. phase detecting signal $S_{PDX}$).

The comparator $CMP_1$ is utilized to compare the phase detecting signal $S_{PD}$ generated by the phase detecting module 320 with the phase selecting signal $S_{PH}$, for generating the error signal $S_{ER1}$. For instance, assuming the phase detecting signal $S_{PD}$ generated by the phase detecting module 320 represents the region "$R_1$", when the phase selecting signal $S_{PH}$ represents the region "$R_0$", the error signal $S_{ER1}$ generated by the comparator $CMP_1$ is $-1$; when the phase selecting signal $S_{PH}$ represents the region "$R_2$", the error signal $S_{ER1}$ generated by the comparator $CMP_1$ is 1. In other words, the comparator $CMP_1$ generates the error signal $S_{ER1}$ according to a difference between regions represented by the phase detecting signal $S_{PD}$ and the phase selecting signal $S_{PH}$.

The comparator $CMP_2$ is utilized to compare the phase detecting signal $S_{PD}$ outputted by the shift register $REG_1$ with the phase selecting signal $S_{PH}$, for generating the error signal $S_{ER2}$. Similarly, the comparator $CMP_2$ generates the error signal $S_{ER2}$ according to a difference between regions represented by the phase detecting signal $S_{PD}$ and the phase selecting signal $S_{PH}$. For instance, assuming the phase detecting signal $S_{PD}$ outputted by the shift register $REG_1$ represents the region "$R_1$", when the phase selecting signal $S_{PH}$ represents the region "$R_0$", the error signal $S_{ER2}$ generated by the comparator $CMP_2$ is $-1$; when the phase selecting signal $S_{PH}$ represents the region "$R_2$", the error signal $S_{ER2}$ generated by the comparator $CMP_2$ is 1.

When the weighting circuit 332 receives the error signals $S_{ER1}$ and $S_{ER2}$, the weighting circuit 332 calculates the weighting error signal $S_{WER}$ according to:

$$S_{WER}=(S_{ER1}\times W_1)+(S_{ER2}\times W_2) \qquad (1)$$

where $W_1$ and $W_2$ represent the weighting parameters corresponding to the error signals $S_{ER1}$ and $S_{ER2}$ respectively. The predictor 333 comprises a phase adjusting circuit 3331 and a phase outputting circuit 3332. The phase adjusting circuit 3331 compares the weighting error signal $S_{WER}$ with predetermined threshold values $TH_U$ and $TH_D$, for generating the phase adjusting signal $S_{PA}$. For instance, the predetermined threshold value $TH_U$ equals 2 and the predetermined threshold value $TH_D$ equals $-2$. When the weighting error signal $S_{WER}$ is smaller than the predetermined threshold value $TH_D$, the phase adjusting signal $S_{PA}$ generated by the phase adjusting circuit 3331 represents "shifting right"; when the weighting error signal $S_{WER}$ is larger than the predetermined threshold value $TH_U$, the phase adjusting signal $S_{PA}$ generated by the phase adjusting circuit 3331 represents "shifting left"; when the weighting error signal $S_{WER}$ is between the predetermined threshold values $TH_U$ and $TH_D$, the phase adjusting signal $S_{PA}$ generated by the phase adjusting circuit 3331 represents "no change".

The phase outputting circuit 3332 generates the phase selecting signal $S_{PH}$ according to the phase adjusting signal $S_{PA}$ and a phase selecting signal $S_{PH}$ corresponding to the previous cycle. For instance, assuming in the cycle $T_1$, the phase outputting circuit 3332 generates the phase selecting signal $S_{PH}$ representing the region "$R_1$" directly according to the phase detecting signal $S_{PD}$) representing the region "$R_1$". In the cycle $T_2$, if the phase adjusting signal $S_{PA}$ received by the phase outputting circuit 3332 represents "shifting right", the phase outputting circuit 3332 then adjusts the generated phase selecting signal $S_{PH}$ from representing the region "$R_1$" to representing the region "$R_2$"; if the phase adjusting signal $S_{PA}$ received by the phase outputting circuit 3332 represents "shifting left", the phase outputting circuit 3332 then adjusts the generated phase selecting signal $S_{PH}$ from representing the region "$R_1$" to representing the region "$R_0$"; if the phase adjusting signal $S_{PA}$ received by the phase outputting circuit 3332 represents "no change", the phase outputting circuit 3332 does not adjust the phase selecting signal $S_{PH}$, and the phase selecting signal $S_{PH}$ still represents the region "$R_1$".

Please refer to FIG. 5. FIG. 5 is a diagram illustrating internal signals of the phase selector 330 of the present invention. Assume the weighting parameter $W_1$ is 2, the weighting parameter $W_2$ is 1, and the predetermined threshold values $TH_U$ and $TH_D$ are 2 and $-2$ respectively. As shown in FIG. 5, in the cycle $T_1$, the phase detecting signal $S_{PD}$ represents the region "$R_1$", and at this moment the phase outputting circuit 3332 generates the phase selecting signal $S_{PH}$ representing the region "$R_1$" according to the phase detecting signal $S_{PD}$. In the cycle $T_2$, the phase detecting signal $S_{PD}$ represents the region "$R_1$". The comparator $CMP_1$ compares the phase selecting signal $S_{PH}$ (e.g. representing the region "$R_1$") in the cycle $T_1$ with the phase detecting signal $S_{PD}$ (e.g. representing the region "$R_1$") in the cycle $T_2$, and generates an error signal $S_{ER1}$ with a value of 0. The comparator $CMP_2$ compares the phase selecting signal $S_{PH}$ (e.g. representing the region "$R_1$") in the cycle $T_1$ with the phase detecting signal $S_{PD}$ (i.e. representing the region "$R_1$") in the cycle $T_1$, and generates an error signal $S_{ER2}$ with a value of 0.

The weighting circuit 332 can then calculate the weighting error signal $S_{WER}$ to be 0, according to the formula (1). Since the weighting error signal $S_{WER}$ is between the predetermined threshold values $TH_U$ and $TH_D$, the phase adjusting circuit 3331 generates the phase adjusting signal $S_{PA}$ representing "no change". This way, the phase outputting circuit 3332 does not require adjustment of the phase selecting signal $S_{PH}$, so the phase selecting signal $S_{PH}$ still represents the region "$R_1$" in the cycle $T_2$. In the cycle $T_3$, the phase detecting signal $S_{PD}$ represents the region "$R_2$". The comparator $CMP_1$ compares the phase selecting signal $S_{PH}$ (e.g. representing the region "$R_1$") in the cycle $T_2$ with the phase detecting signal $S_{PD}$ (e.g. representing the region "$R_2$") in the cycle $T_3$, and generates an error signal $S_{ER1}$ with a value of $-1$. The comparators $CMP_2$ compares the phase selecting signal $S_{PH}$ (e.g. representing the region "$R_1$") in the cycle $T_2$ with the phase detecting signal $S_{PD}$ (e.g. representing the region "$R_1$") in the cycle $T_2$, and generates an error signal $S_{ER2}$ with a value of 0.

The weighting circuit 332 can then calculate the weighting error signal $S_{WER}$ to be $-2$ according to the formula (1). Since the weighting error signal $S_{WER}$ is between the predetermined threshold values $TH_U$ and $TH_D$, the phase adjusting circuit 3331 generates the phase adjusting signal $S_{PA}$ representing "no change". This way, the phase outputting circuit 3332 does not require adjustment of the phase selecting signal $S_{PH}$, so the phase selecting signal $S_{PH}$ still represents the region "$R_1$" in the cycle $T_3$.

In the cycle $T_4$, the phase detecting signal $S_{PD}$ represents the region "$R_2$". The comparator $CMP_1$ compares the phase selecting signal $S_{PH}$ (e.g. representing the region "$R_1$") in the cycle $T_3$ with the phase detecting signal $S_{PD}$ (e.g. representing the region "$R_2$") in the cycle $T_4$, and generates an error signal $S_{ER1}$ with a value of −1. The comparators $CMP_2$ compares the phase selecting signal $S_{PH}$ (e.g. representing the region "$R_1$") in the cycle $T_3$ with the phase detecting signal $S_{PD}$ (e.g. representing the region "$R_2$") in the cycle $T_3$, and generates an error signal $S_{ER2}$ with a value of −1.

The weighting circuit 332 can then calculate the weighting error signal $S_{WER}$ to be −3, according to the formula (1). Since the weighting error signal $S_{WER}$ is smaller than the predetermined threshold value $TH_D$, the phase adjusting circuit 3331 generates the phase adjusting signal $S_{PA}$ representing "shifting right". This way, the phase outputting circuit 3332 adjusts the phase selecting signal $S_{PH}$ to represent the region "$R_2$", according to the phase adjusting signal $S_{PA}$ representing "shifting right". Internal signals of the phase selector 330 in cycles $T_5$ and $T_6$ can be extrapolated in similar manners as described above, and the relative description is omitted hereinafter.

Please refer to FIG. 6. FIG. 6 is a diagram illustrating how the phase selector 330 of the present invention can rapidly lock the phase when the input data stream $DS_{IN}$ (e.g. phase detecting signal $S_{PD}$) has small jitter. As shown in FIG. 6, the phase detecting signal $S_{PD}$ represents the region "$R_1$" throughout cycles $T_1$-$T_4$, so the phase selecting signal $S_{PH}$ generated by the phase selector 330 also represents the region "$R_1$" in cycles $T_1$-$T_4$. Since the input data stream $DS_{IN}$ has a small jitter in cycles $T_5$-$T_6$, the phase detecting signal $S_{PD}$ is switched to represent the region "$R_2$". At this moment, the phase selector 330 of the present invention generates the phase selecting signal $S_{PH}$ representing the region "$R_2$" in the cycle $T_6$. By comparing the phase selector 330 of the present invention with the phase selector 130 of the prior art, since the phase selector 130 of the prior art depends on the largest accumulated transition number $N_{R1}$ (e.g. after cycles $T_1$-$T_6$, the accumulated transition number $N_{R1}$ equals 4 and the accumulated transition number $N_{R2}$ equals 2), the phase selector 130 of prior art, under the condition of FIG. 6, still generates the phase selecting signal $S_{PH}$ representing the region "$R_1$" in the cycle $T_6$, causing the back-end processing module 140 to select the incorrect over-sampling signal $S_{OS}$ to be the output data signal $S_{DOUT}$. However, the phase selector 330 of the present invention can generate the phase selecting signal $S_{PH}$ representing the region "$R_2$" in the cycle $T_6$. In other words, the phase selector 330 of the present invention only considers the phase detecting signal $S_{PD}$ of the current cycle and the previous cycle, so the phase selector 330 of the present invention possesses less memory effect compared to the phase selector 130 of the prior art. Therefore, the phase selector 330 of the present invention can rapidly lock the phase when the input data stream $DS_{IN}$ (e.g. phase detecting signal $S_{PD}$) has small jitter, for generating a relatively correct phase selecting signal $S_{PH}$, so the back-end processing module 340 can select the correct over-sampling signal $S_{OS}$ to be the output data signal $S_{DOUT}$.

Please refer to FIG. 7. FIG. 7 is a diagram illustrating how the phase selector 330 can still stably generate the phase-selecting signal $S_{PH}$ when the input data stream $DS_{IN}$ (e.g. phase detecting signal $S_{PD}$) has a large jitter. As shown in FIG. 7, the phase detecting signal $S_{PD}$ changes from representing the region "$R_1$" to representing the region "$R_2$" in cycles $T_1$-$T_4$, and the phase selector 330 generates the phase selecting signal $S_{PH}$ representing the region "$R_2$" in the cycle $T_4$. Since the input data stream $DS_{IN}$ has a large jitter in the cycles $T_5$-$T_8$, the phase detecting signal $S_{PD}$ switches continuously between representing the region "$R_1$" and representing the region "$R_2$". At the same moment, the phase selector 330 of the present invention still stably generates the phase selecting signal $S_{PH}$ representing the region "$R_2$" in the cycles $T_5$-$T_8$. By comparing the phase selector 330 of the present invention with the phase selector 130 of the prior art, since the largest accumulated transition number of the phase selector 130 of prior art switches between $N_{R1}$ and $N_{R2}$, the phase selecting signal $S_{PH}$, under the condition of FIG. 7, generated by the phase selector 130 of the prior art also switches between representing the region "$R_1$" and representing the region "$R_2$", causing the back-end processing module 140 to continuously select different over-sampling signals $S_{OS}$ of different over-sampling instances to be the output data signal $S_{DOUT}$. System instability results as a consequence. However, the sensitivity of the phase selector 330 of the present invention towards the input data stream $DS_{IN}$ (e.g. phase detecting signal $S_{PD}$) having a large jitter can be reduced by appropriately setting the predetermined threshold values $TH_U$ and $TH_D$, and the weighting parameters W. This way, when the input data stream $DS_{IN}$ (e.g. phase detecting signal $S_{PD}$) has a large jitter, the phase selector 330 can still output a stable phase selecting signal $S_{PH}$, so the back-end processing module 340 can stably select a correct over-sampling signal $S_{OS}$ to be the output data signal $S_{DOUT}$.

Figure 8:
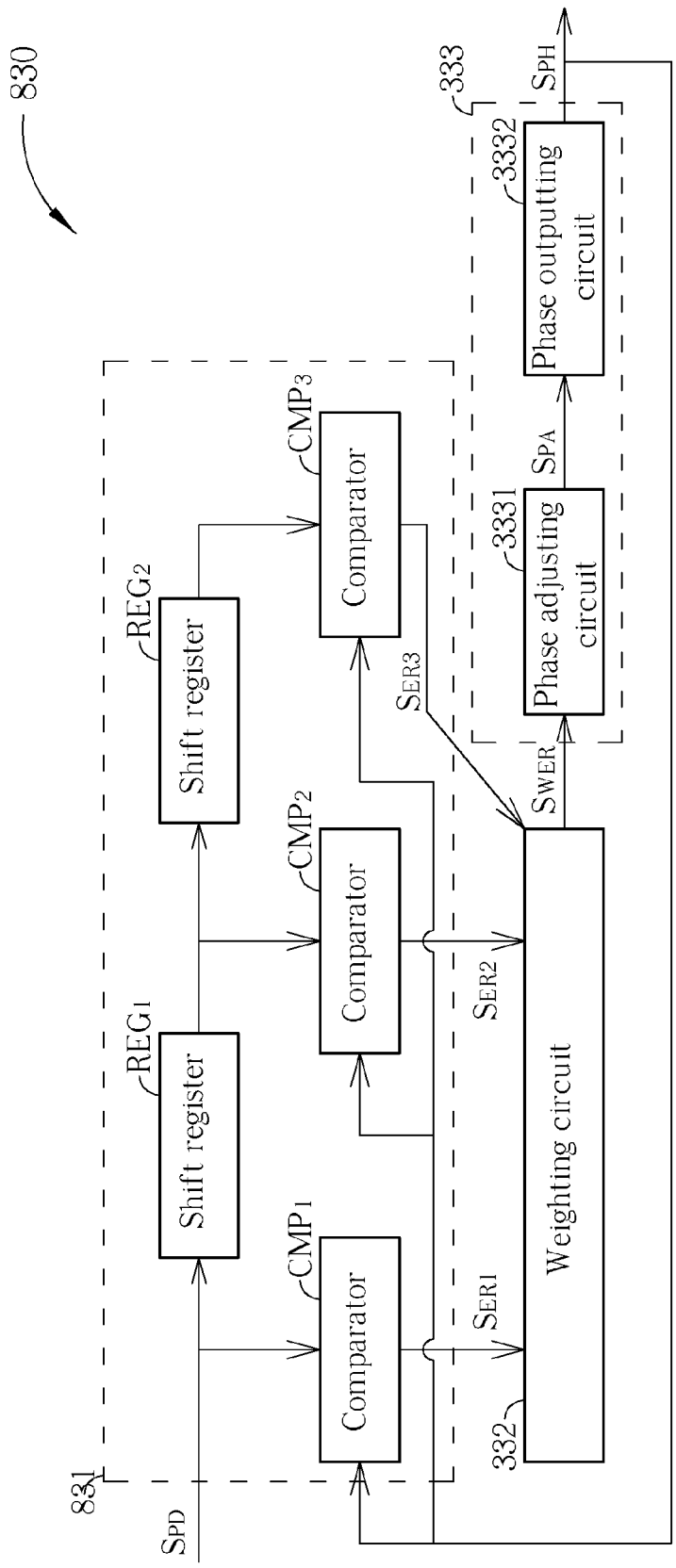
FIG. 8 is a diagram illustrating a phase selector according to another embodiment of the present invention.

Please refer to FIG. 8. FIG. 8 is a diagram illustrating a phase selector 830 according to another embodiment of the present invention. In contrast to the phase selector 330 shown in FIG. 4, a comparing module 831 of the phase selector 830 comprises shift registers $REG_1$ and $REG_2$, and comparators $CMP_1$-$CMP_3$. The shift registers $REG_1$ and $REG_2$ are for temporarily storing and shifting the phase detecting signal $S_{PD}$. Each of comparators $CMP_1$-$CMP_3$ compares the phase detecting signal $S_{PD}$ with the phase selecting signal $S_{PH}$, for generating error signals $S_{ER1}$-$S_{ER3}$ respectively. For instance, when the shift register $REG_1$ receives the phase detecting signal $S_{PD1}$ representing the region "$R_0$" in the cycle $T_1$, the shift register $REG_1$ temporarily stores the phase detecting signal $S_{PD1}$ representing the region "$R_0$". In the cycle $T_2$, the shift register $REG_1$ receives the phase detecting signal $S_{PD2}$ representing the region "$R_1$", and the shift register $REG_1$ outputs the temporarily stored phase detecting signal $S_{PD}$ (e.g. phase detecting signal $S_{PD1}$ representing the region "$R_0$") to the shift register $REG_2$. Hence the shift register $REG_1$ temporarily stores the phase detecting signal $S_{PD2}$ representing the region "$R_1$", and the shift register $REG_2$ temporarily stores the phase detecting signal $S_{PD1}$ representing the region "$R_0$". In the cycle $T_3$, the shift register $REG_1$ receives the phase detecting signal $S_{PD3}$ representing the region "$R_2$". At this moment the shift register $REG_1$ outputs the phase detecting signal $S_{PD2}$ representing the region "$R_1$", and the shift register $REG_2$ outputs the phase detecting signal $S_{PD1}$ representing the region "$R_0$". Therefore, the comparator $CMP_1$ generates the error signal $S_{ER1}$ according to the phase selecting signal $S_{PH}$ and the phase detecting signal $S_{PD3}$ representing the region "$R_2$"; the comparator $CMP_2$ generates the error signal $S_{ER2}$ according to the phase selecting signal $S_{PH}$ and the phase detecting signal $S_{PD2}$ representing the region "$R_1$"; and, the comparator $CMP_3$ generates the error signal $S_{ER3}$ according to the phase selecting signal $S_{PH}$ and the phase detecting signal $S_{PD1}$ representing the region "$R_0$".

When the weighting circuit 332 receives the error signals $S_{ER1}$, $S_{ER2}$ and $S_{ER3}$, the weighting circuit 332 calculates the weighting error signal $S_{WER}$ according to:

$$S_{WER}=(S_{ER1}\times W_1)+(S_{ER2}\times W_2)+(S_{ER3}\times W_3) \qquad (2)$$

where $W_1$-$W_3$ represent the weighting parameters corresponding to the error signals $S_{ER1}$-$S_{ER3}$ respectively. In other words, in contrast to the comparing module 331, the comparing module 831 further compares the phase detecting signal $S_{PD}$ in a cycle previous to the previous cycle with the phase selecting signal $S_{PH}$, for generating the error signal $S_{ER3}$. Hence, the comparing module 331 can be seen as a two level comparing module (i.e. considers the phase detecting signal $S_{PD}$ of the previous cycle and the current cycle), and the comparing module 831 can be seen as a three level comparing module (i.e. considers the phase detecting signal $S_{PD}$ in the cycle previous to the previous cycle, the previous cycle and the current cycle). Therefore, the comparing module of the present invention can be designed with more levels according to practical demands, for adjusting the memory effect of the phase selector of the present invention.

Please refer to FIG. 9. FIG. 9 is a diagram illustrating internal signals of the phase selector 830 according to an embodiment of the present invention. In FIG. 9, weighting parameters $W_1$-$W_3$ are assumed to be 2, 1 and 1 respectively. The operating principle of the phase selector 830 is similar to FIG. 5, so the relative description is omitted hereinafter.

Figure 10:
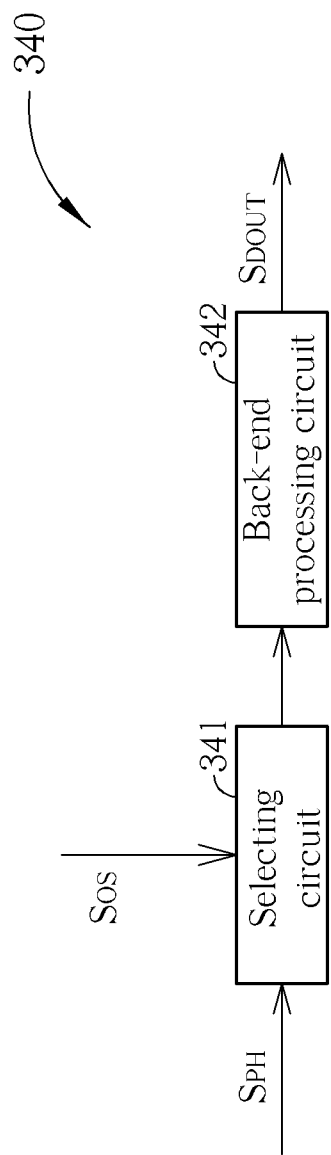
FIG. 10 is a diagram illustrating the back-end processor module of the present invention.

Please refer to FIG. 10. FIG. 10 is a diagram illustrating the back-end processor module 340 of the present invention. The back-end processor module 340 comprises a selecting circuit 341 and a back-end processing circuit 342. The selecting circuit 341 is for selecting the over-sampling signal $S_{OS}$ corresponding to an appropriate over-sampling instance, according to the phase selecting signal $S_{PH}$. More specifically, the selecting circuit 341 can obtain a transition region of the input data stream $DS_{IN}$ according to the phase selecting signal $S_{PH}$. This way, the selecting circuit 341 can determine an over-sampling instance corresponding to a steady state of the input data stream $DS_{IN}$ accordingly, for selecting the over-sampling signal $S_{OS}$. The back-end processing circuit 342 is for preventing the output data signal $S_{DOUT}$ from overflow or underflow. For instance, when the back-end processing circuit 342 receives more or less than Y over-sampling signals $S_{OS}$ within Y cycles, the back-end processing circuit 342 generates Y output data signals $S_{DOUT}$ according to the received over-sampling signals $S_{OS}$, for preventing overflow or underflow, where Y represents a positive integer. The operating principle of the back-end processing circuit 342 is known by those skilled in the art, so the relative description is omitted hereinafter.

In summary, the present invention provides a phase selector for a clock and data recovery circuit. In the phase selector of the present invention, the comparing module compares the phase detecting signal with the phase selecting signal corresponding to the previous cycle, for generating the error signal. The weighting circuit calculates the weighting error signal according to the error signal and weighting parameters. The predictor compares the weighting error signal with the predetermined threshold value, for generating the phase selecting signal corresponding to the current cycle. When the received input data stream received by the clock and data recovery circuit has a small jitter, the phase selector of the present invention can rapidly lock the phase so as to generate the correct phase selecting signal, for the back-end processing module of the clock and data recovery circuit to select the correct over-sampling signal to be the output data signal. When the input data stream received by the clock and data recovery circuit has a large jitter, the phase selector of the present invention can generate the stable phase selecting signal, for the back-end processing module of the clock and data recovery circuit to stably select the correct over-sampling signal to be the output data signal. Furthermore, by appropriately designing the predetermined threshold value, the weighting parameter and the level configuration of the comparing module, the sensitivity of the phase selector of the present invention towards the input data stream having a large jitter, as well as the memory effect of the phase selector of the present invention, can be adjusted according to practical demands, bringing the user more convenience.

Those skilled in the art will readily observe that numerous modifications and alterations of the device and method may be made while retaining the teachings of the invention.

What is claimed is:

1. A phase selector for tolerating jitter for a clock and data recovery circuit, the clock and data recovery circuit comprising an over-sampling circuit, a phase detecting module and a back-end processing module, the over-sampling circuit over-sampling an input data stream in each cycle, for generating M over-sampling signals, the phase detecting module detecting the M over-sampling signals for determining a transition region of the input data stream in each cycle and generating a phase detecting signal accordingly, the phase selector generating a phase selecting signal according to the phase detecting signal, the back-end processing module selecting one of the M over-sampling signals to be an output data signal according to the phase selecting signal, the phase selector comprising:
  a comparing module, for comparing the phase detecting signal generated by the phase detecting module with a phase selecting signal corresponding to a previous cycle, and comparing a phase detecting signal corresponding to previous N cycles with the phase selecting signal corresponding to the previous cycle, for generating (N+1) error signals;
  a weighting circuit, for calculating a weighting error signal according to the (N+1) error signals and (N+1) weighting parameters; and
  a predictor, for comparing the weighting error signal, a first predetermined threshold value and a second predetermined threshold value, for generating a phase adjusting signal, and generating the phase selecting signal according to the phase adjusting signal and the phase selecting signal corresponding to the previous cycle;
  wherein M and N represent positive integers greater than 1, respectively.

2. The phase selector of claim 1, wherein the comparing module comprises:
  N shift registers, the N shift registers coupled in series, for shifting and temporarily storing the phase detecting signal corresponding to the previous N cycles;
    wherein when the phase detecting signal generated by the phase detecting module is inputted to the comparing module, a Kth register of the N shift registers outputs the temporarily stored phase detecting signal corresponding to a phase detecting signal corresponding to previous K cycles; and
  (N+1) comparators, for comparing the phase detecting signal temporarily stored in the N shift registers, the phase detecting signal generated by the phase detecting module, and the phase selecting signal corresponding to the previous cycle, for generating the (N+1) error signals;
    wherein when the phase detecting signal generated by the phase detecting module is inputted to the comparing module, a first comparator of the (N+1) comparators compares the phase detecting signal generated by the phase detecting module with the phase selecting signal corresponding to the previous cycle, for generating a first error signal of the (N+1) error signals;
    wherein when the phase detecting signal generated by the phase detecting module is inputted to the comparing module, a Kth comparator of the (N+1) comparators compares a phase detecting signal corresponding to the previous K cycles outputted by the Kth register of the N shift registers with the phase selecting signal corresponding to the previous cycle, for generating a (K+1)th error signal of the (N+1) error signals;

wherein 1≤K≤N.

3. The phase selector of claim 1, wherein the weighting circuit calculates the weighting error signal according to:

$$S_{WER}=(S_{ER1} \times W_1)+(S_{ER2} \times W_2)+ \ldots +(S_{ER(N+1)} \times W_{(N+1)});$$

wherein $S_{WER}$ represents the weighting error signal, $S_{ER1} \sim S_{ER(N+1)}$ represent the (N+1) error signals respectively, and $W_1 \sim W_{(N+1)}$ represent the (N+1) weighting parameters respectively.

4. The phase selector of claim 1, wherein the predictor comprises:
a phase adjusting circuit, for comparing the weighting error signal, the first predetermined threshold value and the second predetermined threshold value, for generating the phase adjusting signal; and
a phase outputting circuit, for generating the phase selecting signal according to the phase adjusting signal and a phase selecting signal corresponding to the previous cycle.

5. The phase selector of claim 1, wherein each cycle is divided into M regions according to the M over-sampling instances, the phase selecting signal is used for indicating the input data stream undergoes transition at an Ith region of the M regions, and 1≤I≤M.

6. The phase selector of claim 5, wherein when the weighting error signal is larger than the first predetermined threshold value, and the phase selecting signal corresponding to the previous cycle represents a Jth region of the M regions, the phase outputting circuit outputs the phase selecting signal representing a (J−1)th region of the M regions; when the weighting error signal is smaller than the second predetermined threshold value, and the phase selecting signal corresponding to the previous cycle represents the Jth region of the M regions, the phase outputting circuit outputs a (J+1)th region of the M regions; when the weighing error signal is between the first predetermined threshold value and the second predetermined threshold value, and the phase selecting signal corresponding to the previous cycle represents the Jth region of the M regions, the phase outputting circuit outputs the Jth region of the M regions; J represents a positive integer, and 1≤J≤M.

7. The phase selector of claim 1, wherein the back-end processor comprises:
a selecting circuit, for selecting an Lth over-sampling instance of the M over-sampling signals according to the phase selecting signal, and outputting an Lth over-sampling signal of the M over-sampling signals to be the output data signal, according to the Lth over-sampling instant of the M over-sampling signals; and
a back-end processing circuit, for preventing the output data signal from overflow or underflow.

8. The phase selector of claim 7, wherein when the back-end processing circuit receives more or less than Y over-sampling signals from the selecting circuit within Y cycles, the back-end processing circuit generates Y output data signals according to the received over-sampling signals; and Y represents a positive integer greater than 1.

9. A clock and data recovery circuit, comprising:
an over-sampling circuit, for over-sampling an input data stream in each cycle to generate M over-sampling signals;
a phase detecting module for detecting the M over-sampling signals, to determine a transition region of the input data stream in each cycle, and generating a phase detecting signal accordingly;
a phase selector for generating a phase selecting signal according to the phase detecting signal, wherein the phase selector comprises:
a comparing module, for comparing the phase detecting signal generated by the phase detecting module with a phase selecting signal corresponding to a previous cycle, and comparing a phase detecting signal corresponding to previous N cycles with the phase selecting signal corresponding to the previous cycle to generate (N+1) error signals;
a weighting circuit, for calculating a weighting error signal according to the (N+1) error signals and (N+1) weighting parameters; and
a predictor, for comparing the weighting error signal, a first predetermined threshold value and a second predetermined threshold value to generate a phase adjusting signal, and generating the phase selecting signal according to the phase adjusting signal and the phase selecting signal corresponding to the previous cycle, wherein M and N are positive integers greater than 1, respectively; and
a back-end processing module, the back-end processing module selecting one of the M over-sampling signals to be an output data signal, according to the phase selecting signal.

10. A phase selecting method for tolerating jitter for a clock and data recovery circuit, the clock and data recovery circuit comprising an over-sampling circuit, a phase detecting module, and a back-end processing module, the over-sampling circuit over-sampling an input data stream in each cycle, for generating M over-sampling signals, the phase detecting module detecting the M over-sampling signals for determining a transition region of the input data stream in each cycle and generating a phase detecting signal accordingly, the phase selecting method generating a phase selecting signal according to the phase detecting signal, the back-end processing module selecting one of the M over-sampling signals to be an output data signal according to the phase selecting signal, the phase selecting method comprising:
comparing the phase detecting signal generated by the phase detecting module with a phase selecting signal corresponding to a previous cycle, and comparing a phase detecting signal of previous N cycles with the phase selecting signal corresponding to the previous cycle, for generating (N+1) error signals;
calculating a weighting error signal according to the (N+1) error signals and (N+1) weighting parameters;
comparing the weighting error signal, a first predetermined threshold value and a second predetermined threshold value, for generating a phase adjusting signal; and
generating the phase selecting signal according to the phase adjusting signal and the phase selecting signal corresponding to the previous cycle;
wherein M and N represent positive integers greater than 1, respectively.

11. The phase selecting method of claim 10, wherein calculating the weighting error signal according to the (N+1) error signals and the (N+1) weighting parameters comprises:
calculating the weighting error signal according to:

$$S_{WER}=(S_{ER1} \times W_1)+(S_{ER2} \times W_2)+ \ldots +(S_{ER(N+1)} \times W_{(N+1)});$$

wherein $S_{WER}$ represents the weighting error signal, $S_{ER1} \sim S_{ER(N+1)}$ represent the (N+1) error signals respectively, and $W_1 \sim W_{(N+1)}$ represent the (N+1) weighting parameters respectively.

12. The phase selecting method of claim 10, wherein each cycle is divided into M regions according to the M oversampling instances, and the phase selecting signal is used for indicating the input data stream undergoes transition at an Ith region of the M regions.

13. The phase selecting method of claim 12, wherein comparing the weighting error signal, the first predetermined threshold value and the second predetermined threshold value, for generating the phase adjusting signal comprises:
   when the weighting error signal is larger than the first predetermined threshold value, generating the phase adjusting signal which represents shifting left;
   when the weighting error signal is larger than the second predetermined threshold value, generating the phase adjusting signal which represents shifting right; and
   when the weighting error signal is between the first predetermined threshold value and the second predetermined threshold value, generating the phase adjusting signal which represents no change.

14. The phase selecting method of claim 13, wherein generating the phase selecting signal according to the phase adjusting signal and the phase selecting signal corresponding to the previous cycle comprises:
   when phase adjusting signal represents shifting left, and the phase selecting signal corresponding to the previous cycle represents a Jth region of the M regions, outputting the phase selecting signal representing a (J−1)th region of the M regions;
   when the phase adjusting signal represents shifting right, and the phase selecting signal corresponding to the previous cycle represents the Jth region of the M regions, outputting the phase selecting signal representing a (J+1)th region of the M regions;
   when the weighting error signal is between the first predetermined threshold value and the second predetermined threshold value, and the phase selecting signal corresponding to the previous cycle represents the Jth region of the M regions, outputting the Jth region of the M regions;
   wherein $1 \leq J \leq M$.

* * * * *